(12) United States Patent
Staehler et al.

(10) Patent No.: US 11,793,175 B2
(45) Date of Patent: Oct. 24, 2023

(54) METHOD FOR MONITORING AT LEAST ONE AQUACULTURE POND AND AQUACULTURE POND MONITORING SYSTEM

(71) Applicant: BASF SE, Ludwigshafen am Rhein (DE)

(72) Inventors: Peer Staehler, Ludwigshafen (DE); Moritz Erhart, Limburgerhof (DE); Daniel Aydin, Ludwigshafen (DE)

(73) Assignee: BASF SE, Ludwigshafen Am Rhein (DE)

( * ) Notice: Subject to any disclaimer, the term of this patent is extended or adjusted under 35 U.S.C. 154(b) by 14 days.

(21) Appl. No.: 16/754,524

(22) PCT Filed: Aug. 14, 2018

(86) PCT No.: PCT/EP2018/072043
§ 371 (c)(1),
(2) Date: Apr. 8, 2020

(87) PCT Pub. No.: WO2019/072442
PCT Pub. Date: Apr. 18, 2019

(65) Prior Publication Data
US 2020/0275640 A1 Sep. 3, 2020

(30) Foreign Application Priority Data
Oct. 10, 2017 (EP) ..................................... 17195734

(51) Int. Cl.
*A01K 63/04* (2006.01)
*A01K 61/13* (2017.01)
(Continued)

(52) U.S. Cl.
CPC ............ *A01K 63/042* (2013.01); *A01K 61/13* (2017.01); *A01K 61/80* (2017.01); *B64C 39/02* (2013.01);
(Continued)

(58) Field of Classification Search
CPC ...... A01K 63/042; A01K 61/13; A01K 61/60; A01K 61/80; B64C 39/02;
(Continued)

(56) References Cited

U.S. PATENT DOCUMENTS 5,961,831 A * 10/1999 Lee .......................... C02F 3/302
210/614
7,690,247 B1 * 4/2010 Lapota ................... G01C 13/00
73/61.51
(Continued)

FOREIGN PATENT DOCUMENTS

CN 205594457 U * 9/2016 ............... G05D 1/10
CN 106719230 A 5/2017
(Continued)

OTHER PUBLICATIONS

International Search Report dated Nov. 12, 2018 in PCT/EP2018/072043, citing documents AO, AQ through AS, AW, AX and AZ therein, 3 pages.
(Continued)

*Primary Examiner* — Brady W Frazier
*Assistant Examiner* — Zoe Tam Tran
(74) *Attorney, Agent, or Firm* — Armstrong Teasdale LLP

(57) ABSTRACT

A method (110) for monitoring at least one aquaculture pond (112) is proposed. The method (110) comprises: a) monitoring at least one aerial parameter of use of the at least one aquaculture pond (112); b) determining a temporal development of the aerial parameter of use; and c) determining an
(Continued)

intensity of use of the aquaculture pond (112) by using the temporal development of the aerial parameter of use.

17 Claims, 8 Drawing Sheets

(51) Int. Cl.

| | |
|---|---|
| *A01K 61/80* | (2017.01) |
| *B64C 39/02* | (2023.01) |
| *B64G 1/10* | (2006.01) |
| *G05B 19/042* | (2006.01) |
| *B64U 101/30* | (2023.01) |

(52) U.S. Cl.
CPC ....... *B64G 1/1021* (2013.01); *G05B 19/0428* (2013.01); *B64G 2001/1028* (2013.01); *B64U 2101/30* (2023.01); *G05B 2219/24015* (2013.01)

(58) Field of Classification Search
CPC .......... B64C 2201/123; G05B 19/0428; G05B 2219/24015; B64G 1/1021; B64G 2001/1028
USPC ......................................................... 119/230
See application file for complete search history.

(56) References Cited

U.S. PATENT DOCUMENTS

| | | | | |
|---|---|---|---|---|
| 9,516,865 | B2* | 12/2016 | Delabbio | A01K 61/00 |
| 10,162,353 | B2* | 12/2018 | Hammond | G01S 17/933 |
| 10,716,270 | B2* | 7/2020 | Shoham | A01K 61/00 |
| 2012/0208264 | A1* | 8/2012 | Bernd | G01N 21/85 |
| | | | | 435/288.7 |
| 2013/0174792 | A1 | 7/2013 | Delabbio | |
| 2014/0111332 | A1* | 4/2014 | Przybylko | G08B 21/0269 |
| | | | | 340/539.1 |
| 2014/0261151 | A1* | 9/2014 | Ronning | A01M 29/10 |
| | | | | 116/22 A |
| 2015/0164052 | A1 | 6/2015 | Delabbio | |
| 2015/0250113 | A1 | 9/2015 | Shoham et al. | |
| 2015/0346726 | A1* | 12/2015 | Davoodi | B63G 8/001 |
| | | | | 701/21 |
| 2016/0046374 | A1* | 2/2016 | Kugelmass | G05D 1/042 |
| | | | | 701/8 |
| 2016/0135380 | A1 | 5/2016 | Shoham et al. | |
| 2016/0135397 | A1 | 5/2016 | Shoham et al. | |
| 2016/0183500 | A1 | 6/2016 | Delabbio | |
| 2017/0006781 | A1 | 1/2017 | Shoham et al. | |
| 2017/0006790 | A1 | 1/2017 | Shoham et al. | |
| 2018/0356221 | A1* | 12/2018 | Kusumoto | G05D 9/12 |
| 2020/0063388 | A1* | 2/2020 | Rodriguez Larreta | C02F 3/327 |

FOREIGN PATENT DOCUMENTS

| | | | | |
|---|---|---|---|---|
| CN | 106841152 A | 6/2017 | | |
| WO | WO 02/27995 A2 | 4/2002 | | |
| WO | WO-2011089007 A2 * | 7/2011 | ............. | A01K 63/00 |
| WO | WO 2013/096840 A1 | 6/2013 | | |
| WO | WO 2015/132661 A2 | 9/2015 | | |

OTHER PUBLICATIONS

Ottinger, M., et al., "Large-Scale Assessment of Coastal Aquaculture Ponds with Sentinel-1 Time Series Data", Remote Sensing, vol. 9, No. 5, May 4, 2017, XP055520626, pp. 1-23.

Solpico, D.B., et al., "Towards a Web-based Decision System for Philippine Lakes with UAV Imaging, Water Quality Wireless Network Sensing and Stakeholder Participation", 2015 IEEE Tenth International Conference on Intelligent Sensors, Sensor Networks and Information Processing (ISSNIP), Apr. 7-9, 2015, XP032776721, pp. 1-6.

"Transforming Aquaculture with Connected Devices", Eruvaka Technologies Pvt. Ltd., Andhra Pradesh, India, Retrieved from the Internet: www.eruvaka.com, Received 2017, 4 pages.

Vaiphasa, C., et al., "Impact of solid shrimp pond waste materials on mangrove growth and morality: a case study from Pak Phanang, Thailand", Hydrobiologia, Kluwer Academic Publishers, DO, vol. 591, No. 1, Oct. 1, 2007 (Oct. 1, 2007), XP019527491, pp. 47-57.

"Exploring the potentials for new businesses making use of forestry products:Aiming for coexistence with sustainable forestry resources management." presented Mar. 17, 2017, Japan International Forestry Promotion and Cooperation Center.

Kameyama et al. "Regenerating a Mangrove Swamp in a Derelict Shrimp Pond in Vietnam Using Remote Sensing and GIS," Kankyo Kagaku Kaishi, Society for Environmental Science Japan, vol. 28, No. 1, Jan. 2015, pp. 63-72.

Matsui et al. "Sustainable management of mangrove ecosystems and assessment of $CO_2$ fixation," Foreign Forests and Forestry No. 83 (2012).

Hirai et al. "Some Environmental Issues Accompanying the Rapid Expansion of Shrimp Farming in Tam Giang Lagoon, Central Viet Nam: An Environmental Assessment Based on an Analysis Using High-resolution Satellite Images," Journal of Geography, vol. 119, No. 5, pp. 900-910, 2010.

Fukui et al. "Analysis of Land USe Change in Mangrove Areas in Southern Vietnam," 2005 Academic Exchange Support Fund Research Grant Report, Keio University.

Okubo et al. "What Happened at the Abandoned Thai Shrimp Farm?" Chishitsu News No. 595, p. 19-22, Mar. 2004.

Yamayoshi et al. "Numerical Simulation of Shrimp Cultivation Pond Considering the Effect of Paddle Stirring," Japan Society of Fluid Mechanics, Annual Meeting 2007.

Otsuka et al. "Aquatic environment of shrimp ponds constructed in a mangrove area in Vietnam," Fisheries Engineering, vol. 41, No. 2, pp. 143-152, Oct. 2004.

* cited by examiner

METHOD FOR MONITORING AT LEAST ONE AQUACULTURE POND AND AQUACULTURE POND MONITORING SYSTEM

TECHNICAL FIELD

The invention relates to a method for monitoring at least one aquaculture pond and to an aqua-culture pond monitoring system. The methods and devices of the present invention, as an example, may be used in the field of breeding aquatic organisms, such as shrimp or other aquatic animals. Other applications, such as the cultivation of aquatic plants, however, are also feasible.

BACKGROUND ART

Aquaculture is usually understood to refer to the farming of aquatic organisms, such as fish, molluscs, crustaceans and aquatic plants. The largest part of aquacultural farming, specifically shrimp farming, takes place in Asia, particularly in Thailand and China, and Latin America, particularly in Ecuador, Brazil and Mexico. Ottinger et al. (Marco Ottinger, Kersten Clauss and Claudia Kuenzer, "Large-Scale Assessment of Costal Aquaculture Ponds with Sentinel-1 Time Series Data", Remote Sensing 2017, 9(5), 440) present in their study an earth observation based approach to detect aquacultural ponds in coastal areas with dense time series of high spatial resolution Sentinel-1 SAR (Synthetic Aperture Radar) data. They report that the different backscatter responses of the pond components (dikes and enclosed water surface) and aquaculture's distinct rectangular structure allow for separation of aquaculture areas from other natural water bodies allowing them to map aquaculture ponds in coastal areas with an overall accuracy of 0.83 for four study sites.

The rearing of aquatic organisms in aquaculture usually requires regular stocking and feeding as well as monitoring and controlling of a variety of conditions, such as water temperature, pH, amount of oxygen dissolved in the water and other factors. Thus, numerous methods and devices have been described for monitoring and controlling different aspects of aquatic farming. For example, Eruvaka Technologies Pvt. Ltd., Andhra Pradesh, India (www.eruvaka.com) offers methods and devices to monitor or control, for instance, aerators and feeders used in aquacultures and to track feed consumption and shrimp growth, based on data of water-based sensors.

Further, WO 2015/132661 A2 describes a system and methods for monitoring the growth of an aquatic plant culture and detecting real-time characteristics associated with the aquatic plant culture aquatic plants. The systems and methods may include a control unit configured to perform an analysis of at least one image of an aquatic plant culture. The analysis may include processing at least one collected image to determine at least one physical characteristic or state of an aquatic plant culture. Systems and methods for distributing aquatic plant cultures are also provided. The distribution systems and methods may track and control the distribution of an aquatic plant culture based on information received from various sources. Systems and methods for growing and harvesting aquatic plants in a controlled and compact environment are also provided. The systems may include a bioreactor having a plurality of vertically stacked modules designed to contain the aquatic plants and a liquid growth medium.

Despite control of these aspects aquatic farming often suffers from diseases that affect the aquatic organism. Thus, the use of medication is a means typically drawn on in aquatic farming. Accordingly, WO 2002/027995 A2 describes a system, method and computer program product for controlling disease at an end user location, including (a) testing a range of candidates including at least one of: (i) *Bacillus* species, (ii) *Bacillus* strains, (iii) species of beneficial bacteria (iv) strains of beneficial bacteria and (v) strains of beneficial bacterial viruses, against samples including at least one of pathogenic Vibrio, Gram negative pathogenic bacterial and Gram positive pathogenic bacteria taken from an end user location; (b) performing at least one of the following steps: (i) selecting one or more of the candidates that one of inhibit and attack at least one of the samples by direct inhibition of at least one of in situ antibiotic production, competitive exclusion, production of enzymes that degrade quorum sensing molecules, and (ii) testing a range of quorum sensing inhibitor compounds against the samples; and (c) performing the steps (a) and (b) for the end user location, including one of the country, major region and individual end user location, to target microbial technology to use in bio-control of disease specific to the end user location.

Despite the many advantages of the methods and devices developed to monitor and control different aspects of aquacultures numerous challenges remain to be tackled. Thus, as an example, the monitoring of aquacultures is usually expensive and costly, such that the monitoring of one or several individual aquacultures is, as a general rule, prohibitive, in particular for external breeding tanks.

Problem to be Solved

It is therefore an objective of the present invention to provide a method for monitoring at least one aquaculture pond and an aquaculture pond monitoring system which at least partially avoid the drawbacks and disadvantages of known methods for monitoring at least one aquaculture pond and known aquaculture pond monitoring systems. Specifically, it is desirable to provide a method for monitoring at least one aquaculture pond and an aquaculture pond monitoring system that is applicable easily and cost efficiently monitors one or several individual aquaculture ponds, in particular those being situated in the open air.

SUMMARY

This problem is addressed by a method for monitoring at least one aquaculture pond and an aquaculture pond monitoring system with the features of the independent claims. Advantageous embodiments which might be realized in an isolated fashion or in any arbitrary combination are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the present invention, a method for monitoring at least one aquaculture pond is proposed. The method comprises the following steps, preferably in the indicated order. A different order, however, may be possible. Further, one or several or all steps may be performed once or repeatedly. Furthermore, two or several or all of the steps may be performed successively or in a fully or partially temporally overlapping fashion. The method may in addition to the indicated steps comprise further steps.

The method comprises:
a) monitoring at least one aerial parameter of use of the at least one aquaculture pond;
b) determining a temporal development of the aerial parameter of use; and
c) determining an intensity of use of the aquaculture pond by using the temporal development of the aerial parameter of use.

The term "monitoring" as used herein is a broad term and is to be given its ordinary and customary meaning to a person of ordinary skill in the art and is not to be limited to a special or customized meaning. The term specifically may refer, without limitation, to one or more of observing, surveying or controlling an object, in particular an area or a surface area. The monitoring specifically may comprise recording a sequence of data referring to the parameter to be monitored, such as a data stream or a sequence of data relating to the parameter.

The term "aquaculture" as used herein is a broad term and is to be given its ordinary and customary meaning to a person of ordinary skill in the art and is not to be limited to a special or customized meaning. The term specifically may refer, without limitation to the breeding, rearing or fattening of aquatic organisms such as aquatic plants or aquatic animals. In particular, the aquaculture may be used to breed fish, molluscs, shellfish or crustaceans, including shrimp and/or prawn.

The term "aquaculture pond" as used herein is a broad term and is to be given its ordinary and customary meaning to a person of ordinary skill in the art and is not to be limited to a special or customized meaning. The term specifically may refer, without limitation to an area used for aquaculture or to an area intended to be used for aquaculture, such as an area of a basin or the basin itself. Specifically, the aquaculture pond may comprise a waterbody, in particular an artificial waterbody. The waterbody of the aquaculture pond may contain aquatic organisms intended for aquaculture. The waterbody of the aquaculture pond may, however, also be free or essentially free of aquatic organisms intended for aquaculture, e.g. in a state of preparation of the waterbody for a subsequent introduction and breeding of aquatic organisms. The aquaculture pond may further comprise dikes, walls or the like configured to enclose or contain the waterbody. The aquaculture pond may, however, also be devoid of water. Thus, the aquaculture pond may be drained, e.g. for a fallow period, for maintenance or other reasons. The aquaculture pond may, in particular, have a rectangular or polygonal shape.

The term "essentially free of aquatic organisms intended for aquaculture" as used herein is a broad term and is to be given its ordinary and customary meaning to a person of ordinary skill in the art and is not to be limited to a special or customized meaning. The term specifically may refer, without limitation to a waterbody that is devoid of aquatic organisms intended for aquaculture. Thus, as an example, a waterbody that is intended for breeding shrimp may be, for instance in a state of preparation, devoid of shrimp but may still contain other aquatic organisms, such as aquatic plants or microbes. Alternatively, the term may refer to a waterbody containing a small number of aquatic organisms intended for aquaculture that were not actively introduced into the waterbody and that is unsuitable for a farming of these organisms. Thus, as an example, the waterbody may contain aquatic organisms intended for aquaculture in a number in which these organisms may typically occur in the environment of the aquaculture pond in a natural manner and that may be one or several orders of magnitude smaller than a number of aquatic organisms that is used for seeding an aquaculture of these organisms in the aquaculture pond. Furthermore, in a situation in which a number of the aquatic organisms that were originally intended for aquaculture are dead or unable to reproduce within the waterbody, e.g. due to sickness, such that no further farming effort may be carried out with the residual number, the waterbody is also regarded as essentially free of aquatic organisms intended for aquaculture.

The term "parameter of use" as used herein is a broad term and is to be given its ordinary and customary meaning to a person of ordinary skill in the art and is not to be limited to a special or customized meaning. The term specifically may refer, without limitation to a quantity or variable that describes a state or condition of an object, wherein the state or condition is characteristic for the way in which the object is employed or utilized. The parameter of use may also describe a state or condition of the object in which the object is not used. Further, the parameter of use may describe a condition, an element or a device that may affect or influence the use of the object. Specifically, the parameter of use may describe the presence or the absence of such a condition, element or device. The parameter of use may further, e.g. additionally, also comprise information on processes or devices, e.g. technical devices, in relation to the aquaculture pond and/or its management or use, such as the presence or absence and/or the of use of one or more of the following devices: a water supply and/or management system that may include water mains, pipes, conduits, inlets, outlets, basins, reservoirs, reserve ponds, channels, pumps or water towers;

a drainage device, in particular a drain or an outlet; a device for circulating water within the aquaculture pond; a device for at least partially exchanging water of the aquaculture pond; a cesspit. The drainage device may in particular be configured to at least partially remove or discharge sludge, mud, silt or organic waste from the aquaculture pond. The drainage device may in particular comprise at least one circular pit, which may specifically also be referred to as a "shrimp toilet", which may allow to remove sludge, mud, silt or organic waste e.g. by using a pump. In order to describe different states or conditions the parameter of use may take on one of several values, wherein each value may correspond to or indicate a certain state or condition.

The term "aerial parameter of use" as used herein is a broad term and is to be given its ordinary and customary meaning to a person of ordinary skill in the art and is not to be limited to a special or customized meaning. The term specifically may refer, without limitation to a parameter of use that is determined using aerial sensor data.

The term "aerial sensor data" as used herein is a broad term and is to be given its ordinary and customary meaning to a person of ordinary skill in the art and is not to be limited to a special or customized meaning. The term specifically may refer, without limitation to data acquired by at least one air-based sensor. In particular, the aerial sensor data may be or may comprise at least one image or at least one map. The image and the map acquired by the air-based sensor may also be referred to as aerial image and aerial map, respectively.

The term "air-based sensor" as used herein is a broad term and is to be given its ordinary and customary meaning to a person of ordinary skill in the art and is not to be limited to a special or customized meaning. The term specifically may refer, without limitation to a sensor that is situated in an aboveground position. In particular, the air-based sensor may be situated in an aboveground position above an object, wherein the air-based sensor is configured to sense at least one quality, feature or property of said object, for instance, by generating an image of the object. Specifically, the air-based sensor may be situated in an aboveground position remote from the object. The aerial parameter of use may particularly be based on aerial sensor data acquired by at least one air-based sensor that may be located on a satellite, an airplane or a drone. Thus, the sensor data may be acquired at a considerable distance from the object, such as at a distance in the range from 1 m to 50000 km, preferably from 20 m to 5000 km, more preferably from 30 m to 2000 km. Thus, the air-based sensor may be situated in an aboveground position, wherein the aboveground position and/or its surroundings may be devoid of air. Additionally or alternatively, the aerial parameter of use may particularly be based on aerial sensor data acquired by at least one air-based sensor that may be mounted on a support device that is in contact with the ground. The support device may for example comprise at least one of: a pole; a stake; a post; a pylon. In particular, the support device may be static and may be stably connected to the ground. Alternatively, the support device may be movable or relocatable for example by means of wheels. The aerial sensor data acquired by an air-based sensor located in the above-given distance range from the object may also be referred to as "remote aerial sensor data".

The term "determining" as used herein is a broad term and is to be given its ordinary and customary meaning to a person of ordinary skill in the art and is not to be limited to a special or customized meaning. The term specifically may refer, without limitation to measuring or recording data or information or to providing or deriving a quantity, a variable or a parameter, for example by using available data or information or to assigning a quantity, a variable or a parameter to an object or a situation.

The term "temporal development" as used herein is a broad term and is to be given its ordinary and customary meaning to a person of ordinary skill in the art and is not to be limited to a special or customized meaning. The term specifically may refer, without limitation to a course, an order or a sequence of events, wherein the events takes place at different points in time. Specifically, said events may be identical or may all or in part differ from one another.

The term "intensity of use" as used herein is a broad term and is to be given its ordinary and customary meaning to a person of ordinary skill in the art and is not to be limited to a special or customized meaning. The term specifically may refer, without limitation to a duration during which an object or device is in use or a duration during which an object or device is used for a particular purpose or in a particular manner. Thus, the term intensity of use of the aquaculture pond may in particular refer to a duration during which aquatic organisms are being bred in the aquaculture pond. The intensity of use, however, may also comprise other or additional information. Thus, it may also comprise one or more of: a duration during which no organisms are being bred and other processes are carried out; the process of water addition; the process of water subtraction or draining; a water movement or water aeration; a water movement causing waves, foam, bubbles, currents, whirls or other visible properties; the process of harvesting or partial harvesting of aquatic species from the pond; changing qualities of the water in the pond, comprising its content of oxygen and other molecules, and its chemical properties, comprising pH, salinity or alkalinity, and qualities from the changing composition of the overall pond medium, comprising algae, other microorganisms or macroorganisms.

Step a) of the method may further comprise acquiring aerial sensor data, specifically at least one map or image of aerial sensor data, more specifically a sequence of aerial sensor data. Step a) may furthermore comprise assigning the at least one aerial parameter of use to the aquaculture pond by using the aerial sensor data.

The term "map" as used herein is a broad term and is to be given its ordinary and customary meaning to a person of ordinary skill in the art and is not to be limited to a special or customized meaning. The term specifically may refer, without limitation to at least one image of a surface of an object or a section of the surface of the object, wherein the image comprises a to-scale representation of the surface. In particular, the term may refer to at least one image of the surface of the earth or a section thereof. The image may be acquired by using a variety of imaging techniques as will be described in more detail below. Further, the image may be further processed after generation, such as by an evaluation algorithm or an image recognition algorithm, for example to identify or highlight structures or objects depicted in the image.

The term "image" as used herein is a broad term and is to be given its ordinary and customary meaning to a person of ordinary skill in the art and is not to be limited to a special or customized meaning. The term specifically may refer, without limitation to an at least two-dimensional figure or an at least two-dimensional representation of parameters, specifically parameters referring to properties of an area. Thus, the image may, as an example, comprise at least two-dimensional data or graphical data representing e.g. at least one optical property of an area or another property of an area. Thus, as an example, the image may comprise an at least two-dimensional graphical representation of at least one physical property of the area.

The term "sequence" as used herein is a broad term and is to be given its ordinary and customary meaning to a person of ordinary skill in the art and is not to be limited to a special or customized meaning. The term specifically may refer, without limitation to a plurality objects that that were generated consecutively or represent a process or an order of events.

The aerial parameter of use may, in particular, be assigned to the aquaculture pond by applying at least one evaluation algorithm to the aerial sensor data. In particular, the evaluation algorithm may comprise at least one image recognition algorithm, specifically for detecting one or more of: a color of the aquaculture pond; a pattern within the aquaculture pond, specifically a pattern created by an aeration device or a drainage device; a turbulence of the aquaculture pond; a reflectance of the aquaculture pond. The pattern created by the drainage device may specifically comprise at least one circular structure that may in particular be caused by a circular pit. Further, the evaluation algorithm may comprise searching for at least two different predetermined conditions to be fulfilled, wherein the aerial parameter of use is assigned depending on which one of the predetermined conditions is fulfilled. The two predetermined conditions may for example be a presence and an absence of a color of the aquaculture pond or of a pattern within the aquaculture pond, specifically a pattern created by an aeration device or a turbulence of the aquaculture pond or of a reflectance of the aquaculture pond.

The term "color" as used herein is a broad term and is to be given its ordinary and customary meaning to a person of ordinary skill in the art and is not to be limited to a special or customized meaning. The term specifically may refer, without limitation to a natural color of an object or to a color or coloration given to the object artificially. Thus, the object may be dyed or stained or be assigned a certain color, e.g. by an algorithm, for instance as a mark indicating a certain feature of the object.

The aerial parameter of use may comprise at least one parameter derived by remote aerial sensing, specifically by remote aerial imaging or remote aerial mapping. The remote aerial sensing may comprise sensing by one or more of satellite sensing, sensing by an airplane, sensing by a drone. In particular, the remote aerial sensing may comprise one or more of: visual imaging, infrared imaging, ultraviolet imaging, radar imaging, radio imaging, ultrasound imaging.

The term "visual imaging" as used herein is a broad term and is to be given its ordinary and customary meaning to a person of ordinary skill in the art and is not to be limited to a special or customized meaning. The term specifically may refer, without limitation to an arbitrary imaging technique using electromagnetic waves of the visible range of the spectrum in the range from 640 nm to 380 nm. The term "infrared imaging" as used herein is a broad term and is to be given its ordinary and customary meaning to a person of ordinary skill in the art and is not to be limited to a special or customized meaning. The term specifically may refer, without limitation to an arbitrary imaging technique using electromagnetic waves of the infrared range of the electromagnetic spectrum in the range from 40 µm to 641 nm. The term "ultraviolet imaging" as used herein is a broad term and is to be given its ordinary and customary meaning to a person of ordinary skill in the art and is not to be limited to a special or customized meaning. The term specifically may refer, without limitation to an arbitrary imaging technique using electromagnetic waves of the ultraviolet range of the electromagnetic spectrum in the range from 379 nm to 1 nm. The term "radio imaging" as used herein is a broad term and is to be given its ordinary and customary meaning to a person of ordinary skill in the art and is not to be limited to a special or customized meaning. The term specifically may refer, without limitation to an arbitrary imaging technique using radio waves of the electromagnetic waves in the range from 1 km to 1 m. The terms radio imaging and radar imaging may be used interchangeably throughout this document. The term "ultrasound imaging" as used herein is a broad term and is to be given its ordinary and customary meaning to a person of ordinary skill in the art and is not to be limited to a special or customized meaning. The term specifically may refer, without limitation to an arbitrary imaging technique using ultrasound waves in the range from 16 kHz to 5 GHz. The remote aerial sensing may further comprise other imaging techniques, such as imaging techniques using electromagnetic waves or ultrasound of a wavelength or frequency other than the described wavelengths or frequencies.

The method may further comprise identifying the at least one aquaculture pond in at least one aerial image, specifically in at least one aerial image from which the at least one aerial parameter of use in step a) may be derived. Thus, the aerial image may be or may be part of the aerial sensor data. Further, the aerial parameter of use may be derived from at least one of the following: a turbulence generated within the aquaculture pond, specifically a turbulence created by at least one aeration device within the aquaculture pond and more specifically a turbulence created by at least one paddle wheel within the aquaculture pond; air bubbles generated within the aquaculture pond, specifically air bubbles created by one or more of an aeration device within the aquaculture pond; a color of the aquaculture pond; a reflectance of the aquaculture pond; a pattern within the aquaculture pond, e.g. a pattern comprising at least one circular structure. Furthermore, the aerial parameter of use may be able to adopt at least two values. Specifically, the two values may indicate: i) the aquaculture pond is active, or ii) the aquaculture pond is inactive.

The expression "the aquaculture pond is active" as used herein is a broad term and is to be given its ordinary and customary meaning to a person of ordinary skill in the art and is not to be limited to a special or customized meaning. The term specifically may refer, without limitation to an aquaculture pond that contains aquatic organisms intended for aquaculture.

The expression "the aquaculture pond is inactive" as used herein is a broad term and is to be given its ordinary and customary meaning to a person of ordinary skill in the art and is not to be limited to a special or customized meaning. The term specifically may refer, without limitation to an aquaculture pond that does not contain aquatic organisms intended for aquaculture. Thus, specifically, the inactive aquaculture pond may comprise a waterbody free or essentially free of aquatic organisms intended for aquaculture. Alternatively, the inactive aquaculture pond may be devoid of water.

Furthermore, the at least two values may indicate at least two of the following: i) the aquaculture pond is active; ii) the aquaculture pond is drained; iii) the aquaculture pond is filled with water and is free of aquatic organisms intended for aquaculture. In particular, the value i) may be assigned to the aquaculture pond upon identification of at least one of the following: an aeration of the aquaculture pond, specifically an aeration by a paddle wheel, an air blowing means, a bubble-generation device, an air jet device or a water jet device; an active feeding instrumentation; an automated feeding instrumentation; a security means, specifically a covering device, such as a covering sheet or a net, or a protection device, such as a fence; a change in the security means, such as a change in coverage by the covering device or a change in the fence. Specifically, the security means, in particular the net, may be configured to bar birds from entering the aquaculture pond. Further, the security means, in particular the fence, may specifically be configured to bar terrestrial animals, such as frogs, from entering the aquaculture pond. The intensity of use may particularly comprise information on a duration of the aquaculture pond being active, specifically the duration for which the aerial parameter of use has the value i).

Further, a plurality of aquaculture ponds may be monitored, specifically a plurality of at least 20, preferably at least 50, more preferably at least 100 aquaculture ponds. Specifically, the determining of the intensity of use in step c) may be performed for the plurality of aquaculture ponds simultaneously. Furthermore, in step a) the at least one aerial parameter of use may be determined for the at least one aquaculture pond at a predetermined frequency. The frequency may in particular be in the range of once per hour to once per week, preferably once per 1 day to once per 5 days, more preferably once per 2 days to once per 3 days. Further, in step c) the intensity of use of the aquaculture pond may be determined by sensing a duration of breeding of animals in the aquaculture pond. The duration of breeding of animals may be specifically be determined by the period of time during which the value of the aerial parameter of use assigned to the aquaculture pond indicates that the aquaculture pond is active. Further, in step c) the intensity of use of the aquaculture pond may be determined by sensing a duration during which the aquaculture pond is aerated. Furthermore, in step c) the intensity of use of the aquaculture pond may be determined by sensing the interval between filling and draining of the aquaculture pond. The aquaculture pond may in particular be used for growing one or more of shellfish or crustaceans, preferably shrimp and/or prawn.

The method for monitoring at least one aquaculture pond may further comprise:
d) comparing the intensity of use with at least one reference intensity.

Specifically, depending on the comparison with the at least one reference intensity, information on at least one breeding result may be generated.

The term "breeding result" as used herein is a broad term and is to be given its ordinary and customary meaning to a person of ordinary skill in the art and is not to be limited to a special or customized meaning. The term specifically may refer, without limitation, to an outcome of a farming effort. In particular, the breeding result may be or may indicate the number of animals, plants or other organisms that were the object of the farming effort raised to a certain or predetermined size, weight or age. Additionally or alternatively, the breeding result may be or may indicate a total weight of the animals, plants or other organisms that were the object of the farming effort.

In particular, step d) may be carried out repeatedly and/or successively such as several times over a period of time. Thus, information on the breeding result of a particular aquaculture pond may be generated repeatedly and/or successively, such as several times over a period of time such that a temporal development of the information on the breeding result may be generated or determined.

The information on the at least one breeding result may comprise at least one of the following: information on a successful breeding; information on a failed breeding. The reference intensity in step d) may comprise at least one of the following: a single reference intensity, specifically a minimum duration of breeding; a reference intensity range; a reference intensity table; at least one threshold intensity value. Particularly, the reference intensity in step d) may depend on at least one of the following: a location of the aquaculture pond; a season of the year; a size of the aquaculture pond. Further, the reference intensity in step d) may be updated according to the intensity of use as determined in step c). The method may further comprise:
e) determining at least one urgency score based on the result of the comparison in step d).

The term "urgency score" as used herein is a broad term and is to be given its ordinary and customary meaning to a person of ordinary skill in the art and is not to be limited to a special or customized meaning. The term specifically may refer, without limitation to a value or mark indicating a degree of necessity of an action. As described for step d) and the generation of information on the breeding result, the urgency score may be determined repeatedly and/or successively such as several times over a period of time. Thus, a temporal development of the urgency score of a particular aquaculture pond may be generated or determined.

The method may further comprise:
f) signaling a need for a disease treatment depending on the urgency score, specifically if the urgency score is greater than or greater than or equal to a predefined threshold value.

The method may furthermore comprise:
g) at least one disease treatment step of the aquaculture pond.

Particularly, step g) may comprise at least one measure selected from the group consisting of: an application of a medication, specifically an antibiotic; a changing of breeder for a seeding at a subsequent breeding cycle; a prophylaxis measure for at least one further aquaculture pond in a vicinity of the aquaculture pond, specifically for at least one further aquaculture pond with an urgency score greater than the predefined threshold value; a prophylaxis measure for at least one further aquaculture pond that uses animals obtained from the same breeder.

The method may furthermore comprise
h) determining at least one productivity score based on the result of the comparison in step d).

The term "productivity score" as used herein is a broad term and is to be given its ordinary and customary meaning to a person of ordinary skill in the art and is not to be limited to a special or customized meaning. The term specifically may refer, without limitation, to a value or mark indicating a degree of success of the farming effort. Thus, the intensity of use of the aquaculture pond may be compared to one or several reference intensities as described above in step d). In particular, the intensity of use may comprise information on the duration during which the aquaculture pond was active. Further, the reference intensity may be or may comprise at least one threshold duration, which may, for example, indicate or define the minimum duration of breeding during which the aquaculture pond must have been active to allow the farming effort to be successful. Thus, by comparing the duration during which the aquaculture pond was active with the at least one reference intensity, a degree of success may be determined and a productivity score may be determined for the aquaculture pond. As described above for steps d) and e), the productivity score may be determined repeatedly and/or successively such as several times over a period of time for the aquaculture pond. Thus, a temporal development of the productivity score of the aquaculture pond may be generated or determined.

In a second aspect of the present invention a computer program including computer-executable instructions for performing the method for monitoring at least one aquaculture pond when the program is executed on a computer or computer network is proposed.

In a third aspect of the present invention computer or computer network comprising at least one processor, wherein the processor is adapted to perform the method for monitoring at least one aquaculture pond is proposed.

In a fourth aspect of the present invention a computer program product having program code means is proposed, wherein the program code means are stored on a storage medium, for performing the method according to any one of the preceding method claims, if the program code means are executed on a computer or on a computer network.

In a fifth aspect an aquaculture pond monitoring system for monitoring at least one aquaculture pond is proposed. The aquaculture pond monitoring system, comprises:
  at least one monitoring device configured for monitoring at least one aerial parameter of use of the aquaculture pond; and
  at least one processor programmed
  for determining a temporal development of the aerial parameter of use, and
  for determining an intensity of use of the aquaculture pond by using the temporal development of the aerial parameter of use.

For most of the terms and possible definitions, reference may be made to the description of the methods and devices above. The term "aquaculture pond monitoring system" as used herein is a broad term and is to be given its ordinary and customary meaning to a person of ordinary skill in the art and is not to be limited to a special or customized meaning. The term specifically may refer, without limitation to an assembly comprising a plurality of at least two functional elements, wherein the functional elements may be configured to interact with each other to determine at least one quality or characteristic relating to an aquaculture pond. The quality or characteristic relating to the aquaculture pond may in particular comprise the intensity of use of the aquaculture pond. Specifically, the aquaculture pond monitoring system may comprise at least one first functional element configured for monitoring the aquaculture pond. Said first functional element may particularly comprise at least one monitoring device. The term "monitoring device" as used herein is a broad term and is to be given its ordinary and customary meaning to a person of ordinary skill in the art and is not to be limited to a special or customized meaning. The term specifically may refer, without limitation to a device configured for monitoring an object, wherein monitoring an object may, as described above, in particular refer to one or more of observing, surveying or controlling an object, in particular an area or a surface area. As also noted above, the monitoring specifically may comprise recording a sequence of data referring to a parameter to be monitored, such as a data stream or a sequence of data relating to the parameter. The monitoring device may in particular comprise an air-based sensor as described above. The aquaculture pond monitoring system may further comprise at least one second functional element configured for determining the at least one quality or characteristic relating to the aquaculture pond by means of at least one monitoring result generated by the monitoring device, such as the data recorded by the monitoring device. The second functional element may in particular comprise a processor. The at least two functional elements, specifically the first functional element and the second functional element, may themselves comprise a plurality of components. Thus, the first functional element may in particular comprise at least one of a satellite, an airplane, a drone, a pole, a stake, post, a pylon. The first functional element may further comprise the air-based sensor.

The aquaculture pond monitoring system may further comprise a storage medium. In particular, the temporal development may be at least in part stored in the storage medium. Further, the monitoring device may comprise at least one interface for one or both of receiving the at least one aerial parameter of use of the aquaculture pond or receiving data from which the at least one aerial parameter of use of the aquaculture pond is derivable. The interface may be configured for receiving aerial sensor data, specifically at least one map or image of aerial sensor data, more specifically a sequence of aerial sensor data, and assigning the at least one aerial parameter of use to the aquaculture pond by using the aerial sensor data. The monitoring device may further be configured for assigning the aerial parameter of use to the aquaculture pond by applying at least one evaluation algorithm to the aerial sensor data. The monitoring device may further be configured for receiving and/or processing of aerial sensor data, specifically remote aerial sensor data, more specifically remote aerial imaging data or remote aerial mapping data.

The monitoring device may further be configured for identifying the at least one aquaculture pond in at least one aerial image, specifically at least one aerial image from which the at least one aerial parameter of use may be derived. Furthermore, the processor may be programmed for comparing the intensity of use with at least one reference intensity. The aquaculture pond monitoring system may moreover comprise at least one database comprising the at least one reference intensity.

The database may also comprise further information, specifically further information in relation to the aquaculture pond. The information may be acquired by monitoring the at least one aerial parameter of use of the aquaculture pond, such as the temporal development of the aerial parameter of use and/or the intensity of use of the aquaculture pond and/or the presence or absence or duration of use of an element or a device that may affect or influence the use of the aquaculture pond, such as a water management or supply system that may include water mains, pipes, conduits, inlets, outlets, basins, reservoirs, reserve ponds or water towers; a drainage device, in particular a drain or an outlet; a device for circulating water within the aquaculture pond; a device for at least partially exchanging water of the aquaculture pond; a cesspit; an aeration device. The information may also comprise at least one urgency score and/or at least one productivity score. The information may, however, also be derived or received from other sources, such as from a remote sensing system, which may, for example, provide information on a disease of the aquatic organisms intended for aquaculture of the aquaculture pond and/or on a water quality of the aquaculture pond. The database may also comprise information from other sources. Thus, the database may e.g. comprise meteorological data, legal requirements, such as legal requirements that apply to the use and/or management of the aquaculture pond, information on breeding data and/or market prices. Further, the database may be configured such that it may connect, combine or concatenate the information or a number of different pieces of information concerning the aquaculture pond.

The processor may further be programmed for generating information on at least one breeding result using the comparison with the at least one reference intensity. The processor may further be programmed for updating, after determining the intensity of use, the reference intensity according to the intensity of use. The processor may further be programmed to determine the at least one urgency score based on the result of the comparison of the intensity of use with the reference intensity. The processor may further be programmed for signaling a need for a disease treatment depending on the urgency score, specifically if the urgency score is greater than or equal to a predefined threshold value.

The processor may further be programmed to determine the at least one productivity score based on the result of the comparison of the intensity of use with the reference intensity.

The aquaculture pond monitoring system may further comprise a transmitter for transmitting a signal to a predefined location remote from the processor, preferably to a location close to the aquaculture pond with the urgency score greater than the predefined threshold value. The aquaculture pond monitoring system may further comprise a medication dispenser, wherein the medication dispenser may be configured for releasing medication after receiving from the transmitter the signal indicating the need for the disease treatment.

Further disclosed and proposed herein is a computer program including computer-executable instructions for performing the method according to the present invention in one or more of the embodiments enclosed herein when the program is executed on a computer or computer network. Specifically, the computer program may be stored on a computer-readable data carrier. Thus, specifically, one, more than one or even all of method steps a) to c) as indicated above, as well as optional method steps d), e), f), and g) as also indicated above may be performed by using a computer or a computer network, preferably by using a computer program.

Further disclosed and proposed herein is a computer program product having program code means, in order to perform the method according to the present invention in one or more of the embodiments enclosed herein when the program is executed on a computer or computer network. Specifically, the program code means may be stored on a computer-readable data carrier.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the invention, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, further disclosed herein are:
- a computer or computer network comprising at least one processor, wherein the processor is adapted to perform the method according to one of the embodiments described in this description,
- a computer loadable data structure that is adapted to perform the method according to one of the embodiments described in this description while the data structure is being executed on a computer,
- a computer program, wherein the computer program is adapted to perform the method according to one of the embodiments described in this description while the program is being executed on a computer,
- a computer program comprising program means for performing the method according to one of the embodiments described in this description while the computer program is being executed on a computer or on a computer network,
- a computer program comprising program means according to the preceding embodiment, wherein the program means are stored on a storage medium readable to a computer,
- a storage medium, wherein a data structure is stored on the storage medium and wherein the data structure is adapted to perform the method according to one of the embodiments described in this description after having been loaded into a main and/or working storage of a computer or of a computer network, and
- a computer program product having program code means, wherein the program code means can be stored or are stored on a storage medium, for performing the method according to one of the embodiments described in this description, if the program code means are executed on a computer or on a computer network.

Summarizing and without excluding further possible embodiments, the following embodiments may be envisaged:

Embodiment 1

A method for monitoring at least one aquaculture pond, comprising:
a) monitoring at least one aerial parameter of use of the at least one aquaculture pond;
b) determining a temporal development of the aerial parameter of use; and
c) determining an intensity of use of the aquaculture pond by using the temporal development of the aerial parameter of use.

Embodiment 2

The method according to the preceding embodiment, wherein step a) comprises acquiring aerial sensor data, specifically at least one map or image of aerial sensor data, more specifically a sequence of aerial sensor data, wherein step a) further comprises assigning the at least one aerial parameter of use to the aquaculture pond by using the aerial sensor data.

Embodiment 3

The method according to the preceding embodiment, wherein the aerial parameter of use is assigned to the aquaculture pond by applying at least one evaluation algorithm to the aerial sensor data.

Embodiment 4

The method according to the preceding embodiment, wherein the evaluation algorithm comprises at least one image recognition algorithm, specifically for detecting one or more of: a color of the aquaculture pond; a pattern within the aquaculture pond, specifically a pattern created by an aeration device and/or a drainage device; a turbulence of the aquaculture pond; a reflectance of the aquaculture pond.

Embodiment 5

The method according to any of the two preceding embodiment, wherein the evaluation algorithm comprises searching for at least two different predetermined conditions to be fulfilled, wherein the aerial parameter of use is assigned depending on which one of the predetermined conditions is fulfilled.

Embodiment 6

The method according to any one of the preceding embodiments, wherein the aerial parameter of use comprises at least one parameter derived by remote aerial sensing, specifically by remote aerial imaging or remote aerial mapping.

Embodiment 7

The method according to the preceding embodiment, wherein the remote aerial sensing comprises sensing by one or more of satellite sensing, sensing by an airplane, sensing by a drone.

Embodiment 8

The method according to any one of the two preceding embodiments, wherein the remote aerial sensing comprises one or more of: visual imaging, infrared imaging, ultraviolet imaging, radar imaging, radio imaging, ultrasound imaging.

Embodiment 9

The method according to any one of the preceding embodiments, wherein the method further comprises identifying the at least one aquaculture pond in at least one aerial image, specifically at least one aerial image from which the at least one aerial parameter of use in step a) is derived.

Embodiment 10

The method according to any one of the preceding embodiments, wherein the aerial parameter of use is derived from at least one of the following: a turbulence generated within the aquaculture pond, specifically a turbulence created by at least one aeration device within the aquaculture pond and more specifically a turbulence created by at least one paddle wheel within the aquaculture pond; air bubbles generated within the aquaculture pond, specifically air bubbles created by one or more of an aeration device within the aquaculture pond; a color of the aquaculture pond; a reflectance of the aquaculture pond; a pattern within the aquaculture pond, specifically a pattern comprising at least one circular structure created by at least one drainage device within the aquaculture pond.

Embodiment 11

The method according to any one of the preceding embodiments, wherein the aerial parameter of use can adopt at least two values.

Embodiment 12

The method according to the preceding embodiment, wherein the at least two values indicate: i) the aquaculture pond is active, or ii) the aquaculture pond is inactive.

Embodiment 13

The method according to any one of the two preceding embodiments, wherein the at least two values indicate at least two of the following: i) the aquaculture pond is active; ii) the aquaculture pond is drained; iii) the aquaculture pond is filled with water and is essentially free of aquatic organisms intended for aquaculture.

Embodiment 14

The method according to any one of the two preceding embodiments, wherein the value i) is assigned to the aquaculture pond upon identification of at least one of the following: an aeration of the aquaculture pond, specifically aeration by a paddle wheel, an air blowing means, a bubble-generation device, an air jet device or a water jet device; an active feeding instrumentation; an automated feeding instrumentation; a security means, specifically a covering device, such as a covering sheet or a net, or a protection device, such as a fence; a change in the security means, such as a change in coverage by the covering device or a change in the fence.

Embodiment 15

The method according to any one of the three preceding embodiments, wherein the intensity of use comprises information on a duration of the aquaculture pond being active, specifically the duration for which the aerial parameter of use has the value i).

Embodiment 16

The method according to any one of the preceding embodiments, wherein a plurality of aqua-culture ponds is monitored, specifically a plurality of at least 20, preferably at least 50, more preferably at least 100 aquaculture ponds.

Embodiment 17

The method according to the preceding embodiment, wherein the determining of the intensity of use in step c) is performed for the plurality of aquaculture ponds simultaneously.

Embodiment 18

The method according to any one of the preceding embodiments, wherein in step a) the at least one aerial parameter of use is determined for the at least one aquaculture pond at a predetermined frequency.

Embodiment 19

The method according to the preceding embodiment, wherein the frequency is in the range of once per 1 day to once per 5 days, preferably once per 2 days to once per 3 days.

Embodiment 20

The method according to any one of the preceding embodiments, wherein in step c) the intensity of use of the aquaculture pond is determined by sensing a duration of breeding of animals in the aquaculture pond.

Embodiment 21

The method according to the preceding embodiment, wherein the duration of breeding of animals is determined by the period of time during which the value of the aerial parameter of use assigned to the aquaculture pond indicates that the aquaculture pond is active.

Embodiment 22

The method according to any one of the two preceding embodiments, wherein in step c) the intensity of use of the aquaculture pond is determined by sensing a duration during which the aquaculture pond is aerated.

Embodiment 23

The method according to any one of the preceding embodiments, wherein in step c) the intensity of use of the aquaculture pond is determined by sensing the interval between filling and draining of the aquaculture pond.

Embodiment 24

The method according to any of the preceding embodiments, wherein the aquaculture pond is used for growing one or more of shellfish or crustaceans, preferably shrimp and/or prawn.

Embodiment 25

The method according to any one of the preceding embodiments, further comprising:
  d) comparing the intensity of use with at least one reference intensity.

Embodiment 26

The method according to the preceding embodiment, wherein, depending on the comparison with the at least one reference intensity, information on at least one breeding result is generated.

Embodiment 27

The method according to the preceding embodiment, wherein the information on the at least one breeding result comprises at least one of the following: information on a successful breeding; information on a failed breeding.

Embodiment 28

The method according to any one of the three preceding embodiments, wherein the reference intensity in step d) comprises at least one of the following: a single reference intensity, specifically a minimum duration of breeding; a reference intensity range; a reference intensity table; at least one threshold intensity value.

Embodiment 29

The method according to any one of the four preceding embodiments, wherein the reference intensity in step d) depends on at least one of the following: a location of the aquaculture pond; a season of the year; a size of the aquaculture pond.

Embodiment 30

The method according to any one of the five preceding embodiments, wherein the reference intensity in step d) is updated according to the intensity of use as determined in step c).

Embodiment 31

The method according to any one of the six preceding embodiments, further comprising:
  e) determining at least one urgency score based on the result of the comparison in step d).

Embodiment 32

The method according to the preceding embodiment, further comprising:
  f) signaling a need for a disease treatment depending on the urgency score, specifically if the urgency score is greater than or greater than or equal to a predefined threshold value.

Embodiment 33

The method according to the preceding embodiment, further comprising:
  g) at least one disease treatment step of the aquaculture pond.

Embodiment 34

The method according to the preceding embodiment, wherein step g) comprises at least one measure selected from the group consisting of: an application of a medication, specifically an antibiotic; a changing of breeder for a seeding at a subsequent breeding cycle; a prophylaxis measure for at least one further aquaculture pond in a vicinity of the aquaculture pond, specifically for at least one further aquaculture pond with an urgency score greater than the predefined threshold value; a prophylaxis measure for at least one further aquaculture pond that uses animals obtained from the same breeder.

Embodiment 35

The method according to any one of the ten preceding embodiments, the method further comprising:

h) determining at least one productivity score based on the result of the comparison in step d).

Embodiment 36

A computer program including computer-executable instructions for performing the method according to any one of the preceding embodiments when the program is executed on a computer or computer network.

Embodiment 37

A computer or computer network comprising at least one processor, wherein the processor is adapted to perform the method according to any one of the preceding method embodiments.

Embodiment 38

A computer program product having program code means, wherein the program code means are stored on a storage medium, for performing the method according to any one of the preceding method embodiments, if the program code means are executed on a computer or on a computer network.

Embodiment 39

An aquaculture pond monitoring system for monitoring at least one aquaculture pond, comprising:
  at least one monitoring device configured for monitoring at least one aerial parameter of use of the aquaculture pond; and
  at least one processor programmed
    for determining a temporal development of the aerial parameter of use, and
    for determining an intensity of use of the aquaculture pond by using the temporal development of the aerial parameter of use.

Embodiment 40

The aquaculture pond monitoring system according to the preceding embodiment, wherein the aquaculture pond monitoring system further comprises a storage medium.

Embodiment 41

The aquaculture pond monitoring system according to the preceding embodiment, wherein the temporal development is at least in part stored in the storage medium.

Embodiment 42

The aquaculture pond monitoring system according to any one of the preceding embodiments referring to an aquaculture pond monitoring system, wherein the monitoring device comprises at least one interface for one or both of receiving the at least one aerial parameter of use of the aquaculture pond or receiving data from which the at least one aerial parameter of use of the aquaculture pond is derivable.

Embodiment 43

The aquaculture pond monitoring system according to the preceding embodiment, wherein the interface is configured for receiving aerial sensor data, specifically at least one map or image of aerial sensor data, more specifically a sequence of aerial sensor data, and assigning the at least one aerial parameter of use to the aquaculture pond by using the aerial sensor data.

Embodiment 44

The aquaculture pond monitoring system according to the preceding embodiment, wherein the monitoring device is further configured for assigning the aerial parameter of use to the aquaculture pond by applying at least one evaluation algorithm to the aerial sensor data.

Embodiment 45

The aquaculture pond monitoring system according to any one of the two preceding embodiments, wherein the monitoring device is further configured for receiving and/or processing of the aerial sensor data, specifically remote aerial sensor data, more specifically remote aerial imaging data or remote aerial mapping data Embodiment 46

The aquaculture pond monitoring system according to any of the preceding embodiments referring to an aquaculture pond monitoring system, wherein the monitoring device is further configured for identifying the at least one aquaculture pond in at least one aerial image, specifically at least one aerial image from which the at least one aerial parameter of use is derived.

Embodiment 47

The aquaculture pond monitoring system according to any of the preceding embodiments referring to an aquaculture pond monitoring system, wherein the processor is further programmed for comparing the intensity of use with at least one reference intensity.

Embodiment 48

The aquaculture pond monitoring system according to the preceding embodiment, wherein the aquaculture pond monitoring system further comprises at least one database comprising the at least one reference intensity.

Embodiment 49

The aquaculture pond monitoring system according to any one of the two preceding embodiments, wherein the processor is further programmed for generating information on at least one breeding result using the comparison with the at least one reference intensity.

Embodiment 50

The aquaculture pond monitoring system according to any one of the three preceding embodiments, wherein the processor is further programmed for updating, after determining the intensity of use, the reference intensity according to the intensity of use.

Embodiment 51

The aquaculture pond monitoring system according to any of the four preceding embodiments referring to an aquaculture pond monitoring system, wherein the processor is further programmed to determine at least one urgency score based on the result of the comparison of the intensity of use with the reference intensity.

Embodiment 52

The aquaculture pond monitoring system according to the preceding embodiment, wherein the processor is further programmed for signaling a need for a disease treatment depending on the urgency score, specifically if the urgency score is greater than or equal to a predefined threshold value.

Embodiment 53

The aquaculture pond monitoring system according to any one of the preceding embodiments referring to an aquaculture pond monitoring system, wherein the aquaculture pond monitoring system further comprises a transmitter for transmitting a signal to a predefined location remote from the processor, preferably to a location close to the aquaculture pond with the urgency score greater than the predefined threshold value.

Embodiment 54

The aquaculture pond monitoring system according to the preceding embodiment, wherein the aquaculture pond monitoring system further comprises a medication dispenser, wherein the medication dispenser is configured for releasing medication after receiving from the transmitter the signal indicating the need for the disease treatment.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures.

Therein, identical reference numbers in these Figures refer to identical or functionally comparable elements.

In the Figures:

FIGS. 1A and 1B each show a flowchart of a method for monitoring at least one aquaculture pond according to the present invention;

FIGS. 2A, 2B, 2C and 2D each show aerial sensor data collected at four consecutive points in time;

DETAILED DESCRIPTION OF THE EMBODIMENTS

Figure 1A:
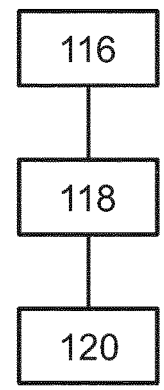
Figure 1B:
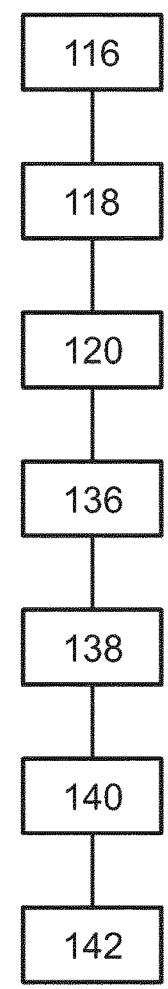

FIGS. 1A and 1B each show a method 110 for monitoring at least one aquaculture pond 112 according to the present invention illustrated by a flow chart 114. The method 110 comprises the following steps, preferably in the indicated order. A different order, however, may also be possible. Further, one or several or all steps may be performed repeatedly. Furthermore, two or several or all of the steps may be performed successively or in a fully or partially temporally overlapping fashion. The method may in addition to the indicated steps comprise further steps.

The steps are, as illustrated in FIG. 1A:
a) monitoring at least one aerial parameter of use of the at least one aquaculture pond 112;
b) determining a temporal development of the aerial parameter of use; and
c) determining an intensity of use of the aquaculture pond 112 by using the temporal development of the aerial parameter of use.

In the flow chart 114 in FIG. 1A the steps are assigned the following reference numbers: step a) is assigned reference number 116, step b) is assigned reference number 118, step c) is assigned reference number 120.

Step a) of the method 110 may further comprise acquiring aerial sensor data 122, specifically at least one map 124 or image of aerial sensor data 122, as depicted in each of FIGS. 2A to 2D. More specifically, a sequence of aerial sensor data 122 may be acquired, as exemplary presented in FIGS. 2A to 2D. Step a) may furthermore comprise assigning the at least one aerial parameter of use to the aquaculture pond 112 by using the aerial sensor data 122. The aerial parameter of use may, in particular, be assigned to the aquaculture pond 112 by applying at least one evaluation algorithm to the aerial sensor data 122. In particular, the evaluation algorithm may comprise at least one image recognition algorithm, specifically for detecting one or more of: a color 126 of the aquaculture pond 112; a pattern 128 within the aquaculture pond 112, specifically a pattern created by an aeration device; a turbulence 130 of the aquaculture pond 112; a reflectance of the aquaculture pond 112. An exemplary selection of aquaculture ponds 112 is labelled in the FIGS. 2A to 2D and may serve to illustrate some of the above-mentioned features. Thus, as an example, the aquaculture pond 112 situated in the top middle region of a demarcated area 125 and for clear distinction marked with the reference number 127 displays a light color 126 in FIGS. 2A, a dark color 126 in FIG. 2B and a pattern 128 characterized by a plurality of light-colored spots distributed on a dark-colored surface in FIGS. 2C and 2D, with the light colored-spots originating from turbulences 130 that may be caused by an aeration 132 of the aquaculture pond 112, 127. Further, the evaluation algorithm may comprise searching for at least two different predetermined conditions to be fulfilled, wherein the aerial parameter of use is assigned depending on which one of the predetermined conditions is fulfilled. The two predetermined conditions may for example be a presence and an absence of a color of the aquaculture pond or of a pattern within the aquaculture pond, specifically a pattern created by an aeration device or a turbulence of the aquaculture pond or of a reflectance of the aquaculture pond.

The aerial parameter of use may comprise at least one parameter derived by remote aerial sensing, specifically by remote aerial imaging or remote aerial mapping. The remote aerial sensing may comprise sensing by one or more of satellite sensing, sensing by an airplane, sensing by a drone. In particular, the remote aerial sensing may comprise one or more of: visual imaging, infrared imaging, ultraviolet imaging, radar imaging, radio imaging, ultrasound imaging. Thus, the aerial parameter of use may be derived from aerial sensor data that may in particular be acquired by on of the above-mentioned methods and devices, as, for example, the aerial sensor data as shown in FIGS. 2A to 2D.

The method 110 may further comprise identifying the at least one aquaculture pond 112 in at least one aerial image, specifically in at least one aerial image from which the at least one aerial parameter of use in step a) may be derived. The aerial image may be or may be part of the aerial sensor data 122. The identifying of the at least one aquaculture pond 112 is not explicitly illustrated in the flow charts 114 representing the method 110 for monitoring at least one aquaculture pond 112 in FIGS. 1A and 1B. Further, the aerial parameter of use may be derived from at least one of the following: a turbulence 130 generated within the aquaculture pond 112, specifically a turbulence 130 created by at least one aeration device within the aquaculture pond 112 and more specifically a turbulence 130 created by at least one paddle wheel within the aquaculture pond 112; air bubbles generated within the aquaculture pond 112, specifically air bubbles created by one or more of an aeration device within the aquaculture pond 112; a color of the aquaculture pond 112; a reflectance of the aquaculture pond 112. Furthermore, the aerial parameter of use may be able to adopt at least two values. Specifically, the two values may indicate: i) the aquaculture pond 112 is active, or ii) the aquaculture 112 pond is inactive. Furthermore, the at least two values may indicate at least two of the following: i) the aquaculture pond 112 is active; ii) the aquaculture pond 112 is drained; iii) the aquaculture pond 112 is filled with water and is essentially free of aquatic organisms intended for aquaculture. In particular, the value i) may be assigned to the aquaculture pond 112 upon identification of at least one of the following: the aeration 132 of the aquaculture pond 112, specifically the aeration 132 by a paddle wheel, an air blowing means, a bubble-generation device, an air jet device or a water jet device; an active feeding instrumentation; an automated feeding instrumentation; a security means, specifically a covering device, such as a covering sheet or a net, or a protection device, such as a fence; a change in the security means, such as a change in coverage by the covering device or a change in the fence. Specifically, the security means, in particular the net, may be configured to bar birds from entering the aquaculture pond 112. Further, the security means, in particular the fence, may specifically be configured to bar terrestrial animals from entering the aquaculture pond 112. Thus, the above-described aquaculture pond 112, 127 may be assigned the aerial parameter of use indicating the aquaculture pond 112, 127 is inactive, specifically, that the aquaculture pond 112, 127 is drained in FIG. 2A. The same aquaculture pond 112, 127 may be assigned the aerial parameter of use indicating the aquaculture pond 112, 127 is inactive, specifically, that the aquaculture pond 112, 127 is filled with water and is free of aquatic organisms intended for aquaculture in FIG. 2B. In FIGS. 2C and 2D, the same aquaculture pond 112, 127 may be assigned the aerial parameter of use indicating the aquaculture pond 112, 127 is active.

The intensity of use may particularly comprise information on a duration of the aquaculture pond 112 being active, specifically the duration for which the aerial parameter of use has the value i). Thus, as an example, the aquaculture pond 112 marked with the additional reference number 131 for clear distinction, may be assigned the parameter of use indicating that the aquaculture pond 112, 131 is inactive in FIGS. 2A, 2B and 2D, while it may be assigned the parameter of use indicating that the aquaculture pond 112, 131 is active in FIG. 2C. Thus, the duration during which the aquaculture pond 112, 131 is active may be determined using the sequence of the aerial sensor data 122 shown in FIGS. 2A to 2D. Further, a plurality 134 of aquaculture ponds 112 may be monitored, for example a plurality 134 of aquaculture ponds 112 as comprised by the demarcated area 125 in FIGS. 2A to 2E. Specifically, a plurality 134 of at least 20, preferably at least 50, more preferably at least 100 aquaculture ponds 112 may be monitored. Specifically, the determining of the intensity of use in step c) may be performed for the plurality of aquaculture ponds 112 simultaneously. Furthermore, in step a) the at least one aerial parameter of use may be determined for the at least one aquaculture pond 112 at a predetermined frequency. The frequency may in particular be in the range of once per 1 day to once per 5 days, preferably once per 2 days to once per 3 days. Further, in step c) the intensity of use of the aquaculture pond 112 may be determined by sensing a duration of breeding of animals in the aquaculture pond 112. The duration of breeding of animals may specifically be determined by the period of time during which the value of the aerial parameter of use assigned to the aquaculture pond 112 indicates that the aquaculture pond 112 is active. Further, in step c) the intensity of use of the aquaculture pond may be determined by sensing a duration during which the aquaculture pond 112 is aerated. Furthermore, in step c) the intensity of use of the aquaculture pond 112 may be determined by sensing the interval between filling and draining of the aquaculture pond 112. The aquaculture pond 112 may in particular be used for growing one or more of shellfish or crustaceans, preferably shrimp and/or prawn.

As shown in FIG. 1B, the method 110 for monitoring at least one aquaculture pond 112 may further comprise:
d) comparing the intensity of use with at least one reference intensity.

Specifically, depending on the comparison with the at least one reference intensity, information on at least one breeding result may be generated.

The information on the at least one breeding result may comprise at least one of the following: information on a successful breeding; information on a failed breeding. The reference intensity in step d) may comprise at least one of the following: a single reference intensity, specifically a minimum duration of breeding; a reference intensity range; a reference intensity table; at least one threshold intensity value. Particularly, the reference intensity in step d) may depend on at least one of the following: a location of the aquaculture pond 112; a season of the year; a size of the aquaculture pond 112. Further, the reference intensity in step d) may be updated according to the intensity of use as determined in step c). The method 110 may further comprise:
e) determining at least one urgency score based on the result of the comparison in step d).

The method 110 may further comprise:
f) signaling a need for a disease treatment depending on the urgency score, specifically if the urgency score is greater than or greater than or equal to a predefined threshold value.

The method 110 may furthermore comprise:
g) at least one disease treatment step of the aquaculture pond 112.

In the flow chart 114 in FIG. 1B the optional steps d), e), f) and g) are assigned the following reference numbers: step d) is assigned reference number 136, step e) is assigned reference number 138, step f) is assigned reference number 140 and step g) is assigned reference number 142.

Particularly, step g) may comprise at least one measure selected from the group consisting of: an application of a medication, specifically an antibiotic; a changing of breeder for a seeding at a subsequent breeding cycle; a prophylaxis measure for at least one further aquaculture pond 112 in a vicinity of the aquaculture pond 112, specifically for at least one further aquaculture pond 112 with an urgency score greater than the predefined threshold value; a prophylaxis measure for at least one further aquaculture pond 112 that uses animals obtained from the same breeder.

Figure 2A:
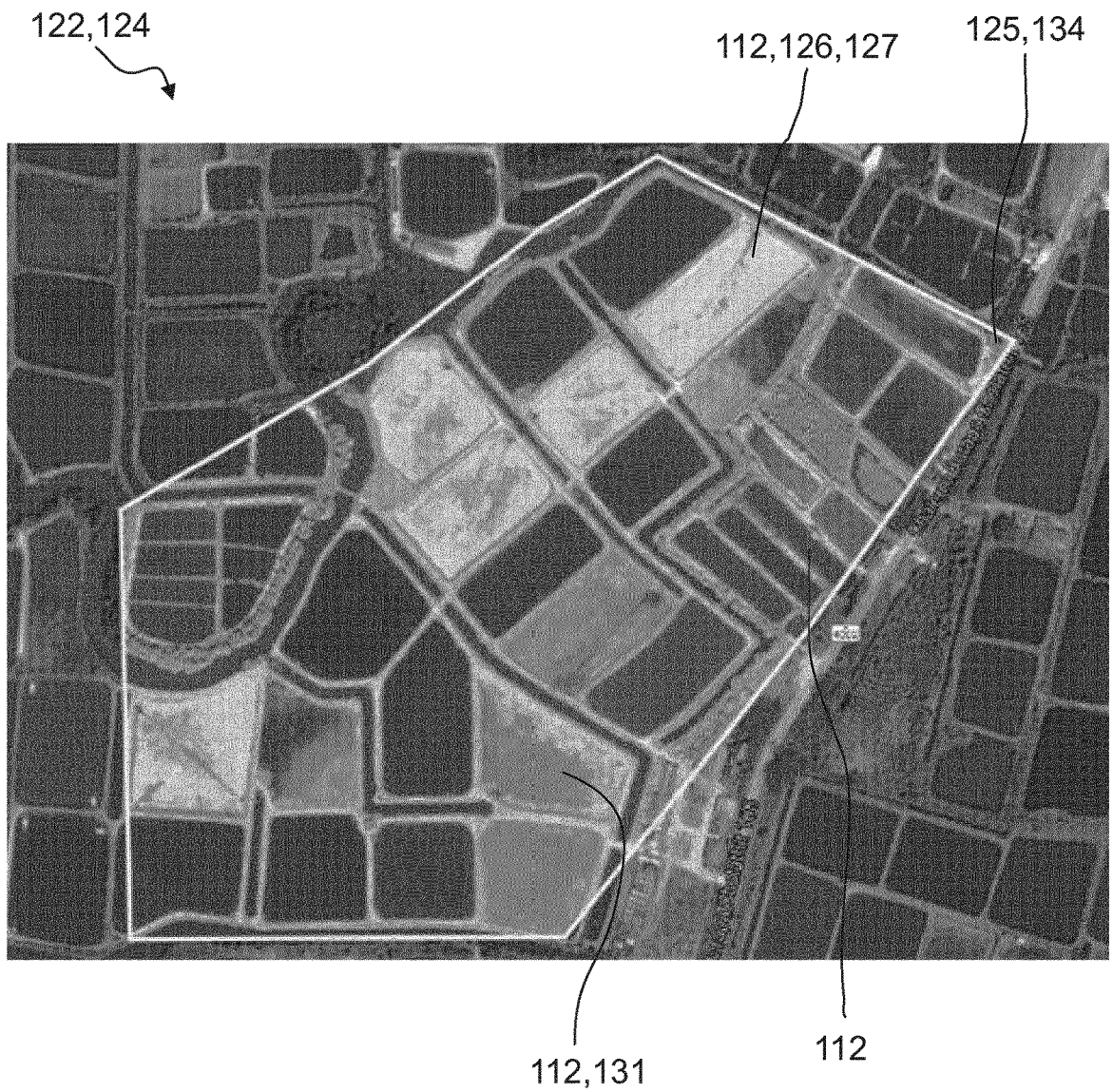
FIG. 2E illustrates the differences between FIG. 2A and each of the FIGS. 2B, 2C and 2D.
Figure 2B:
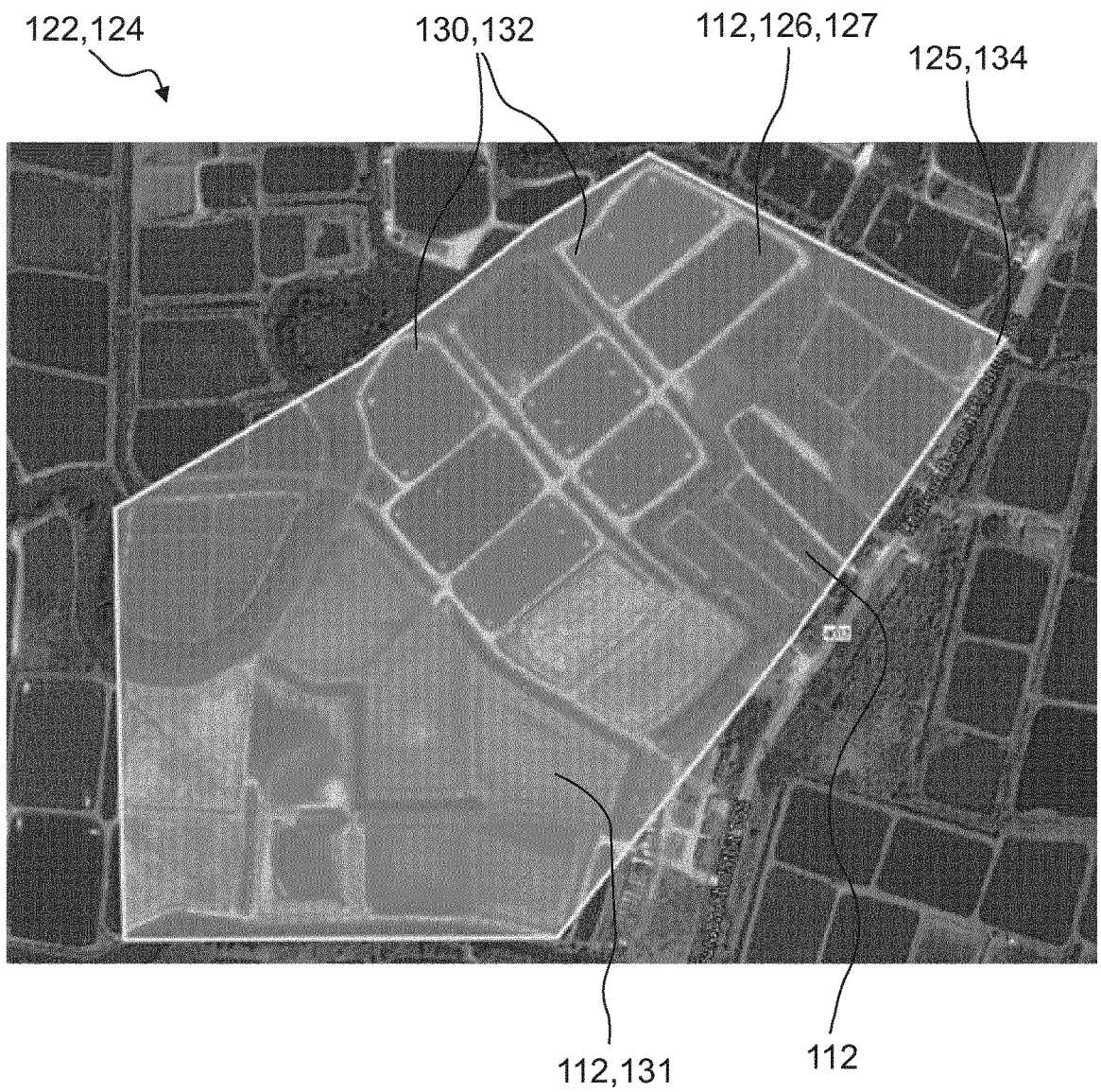
Figure 2C:
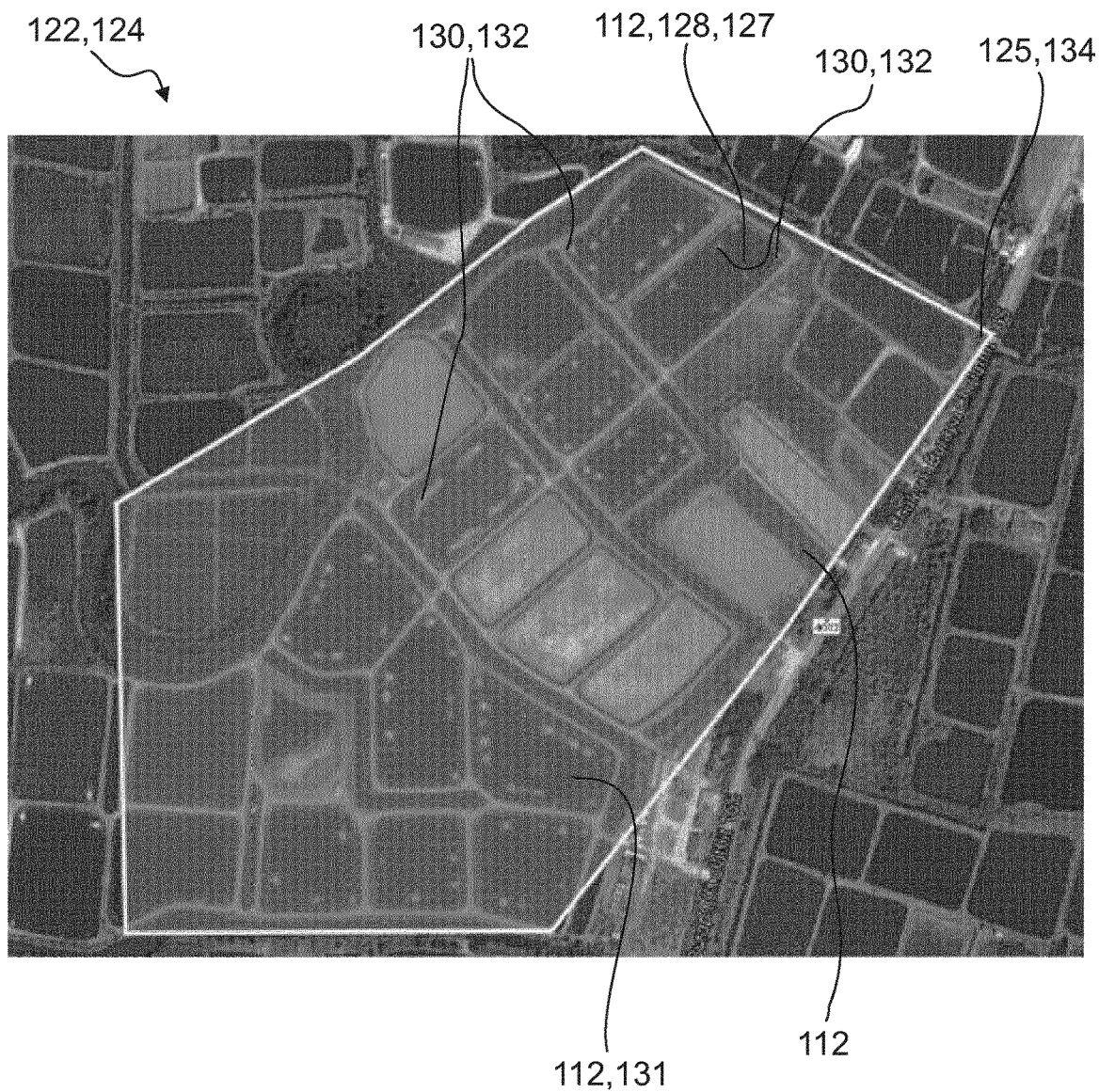
Figure 2D:
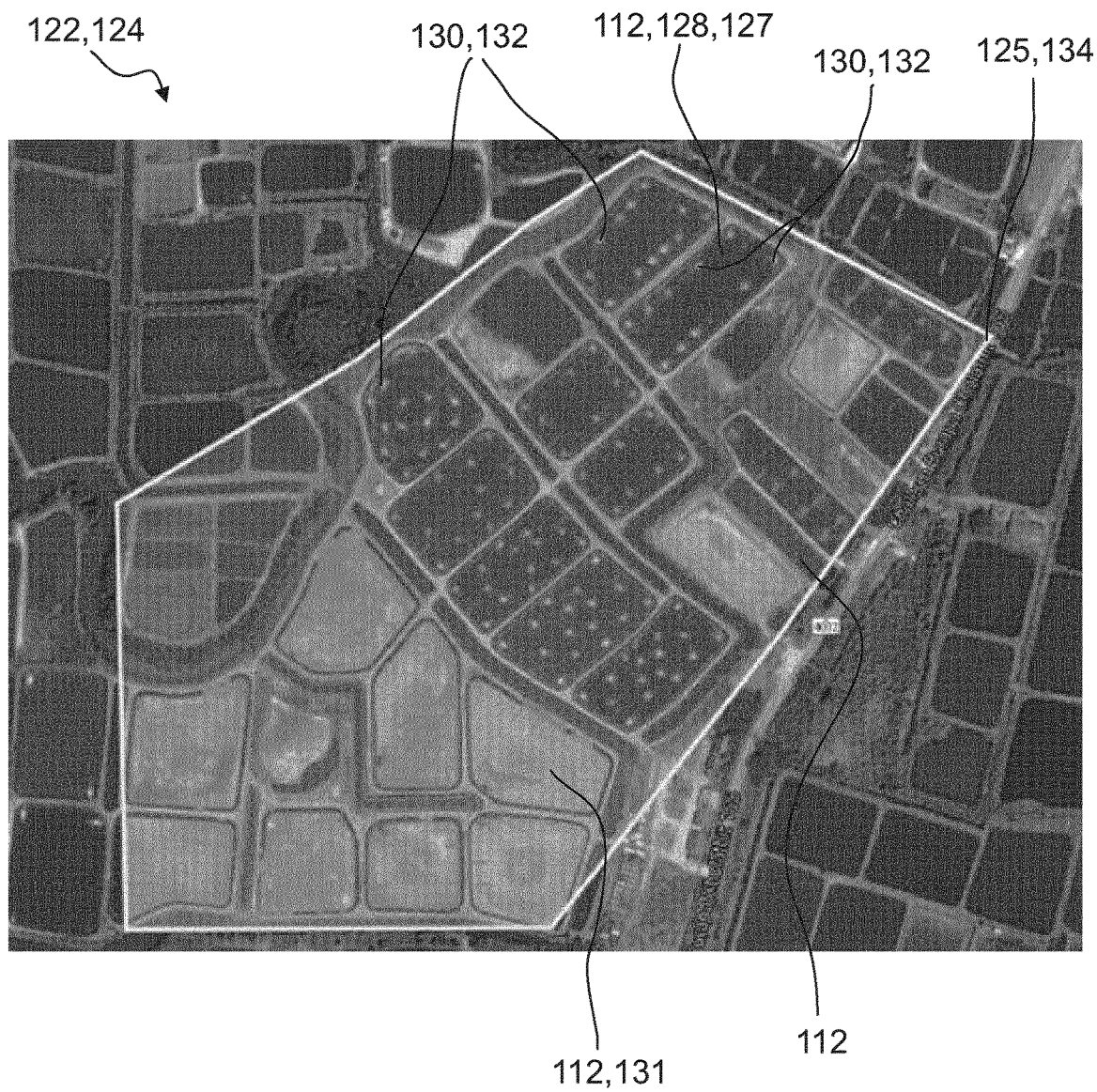
Figure 2E:
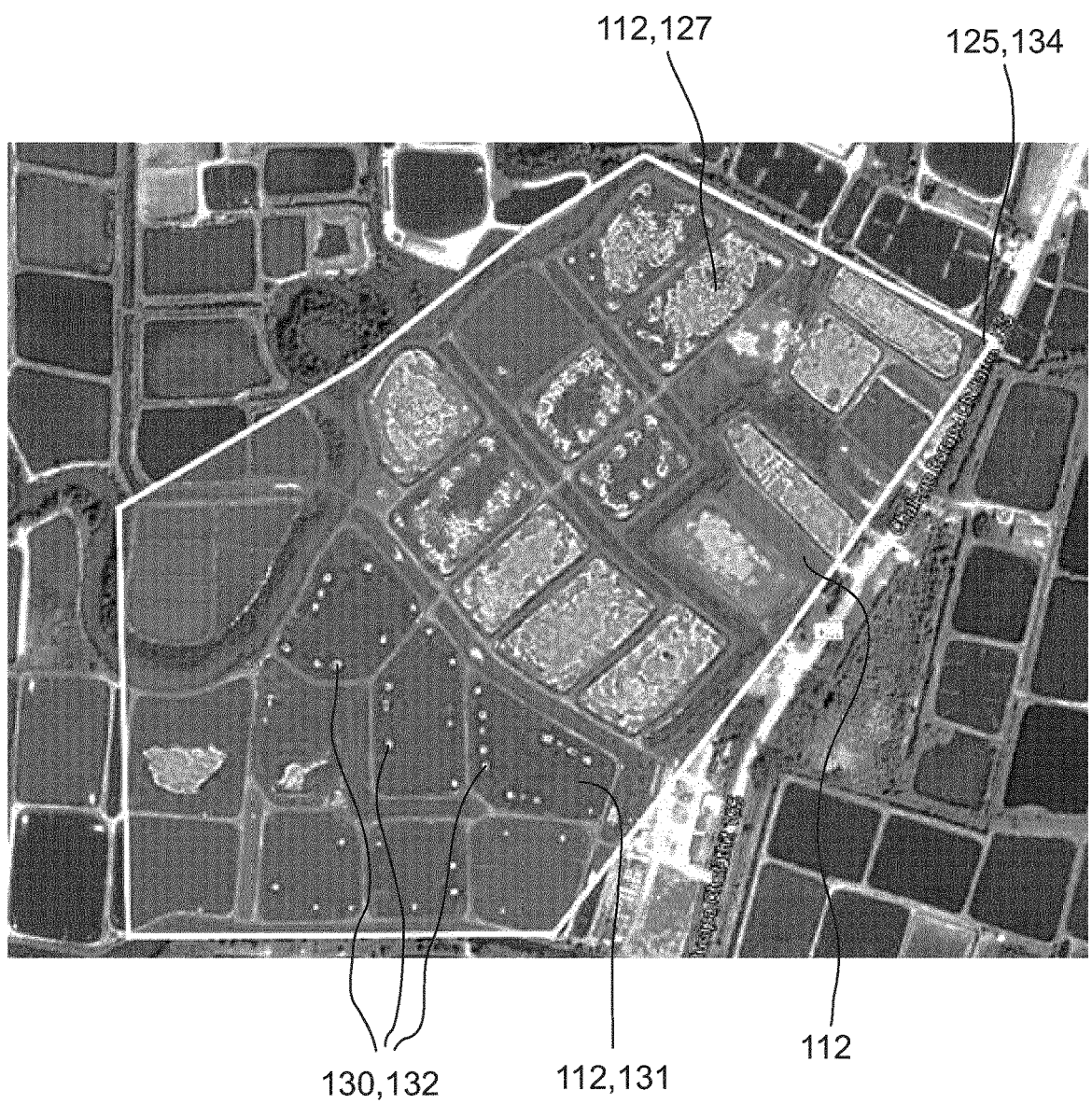

FIG. 2E illustrates the differences between FIG. 2A and each of FIGS. 2B, 2C and 2D within the demarcated area 125. Thus, FIG. 2E represents a superposition of differences. Sections are given an increasingly light coloration for increasingly strong divergence and an increasingly dark coloration for decreasing divergence.

Figure 4:
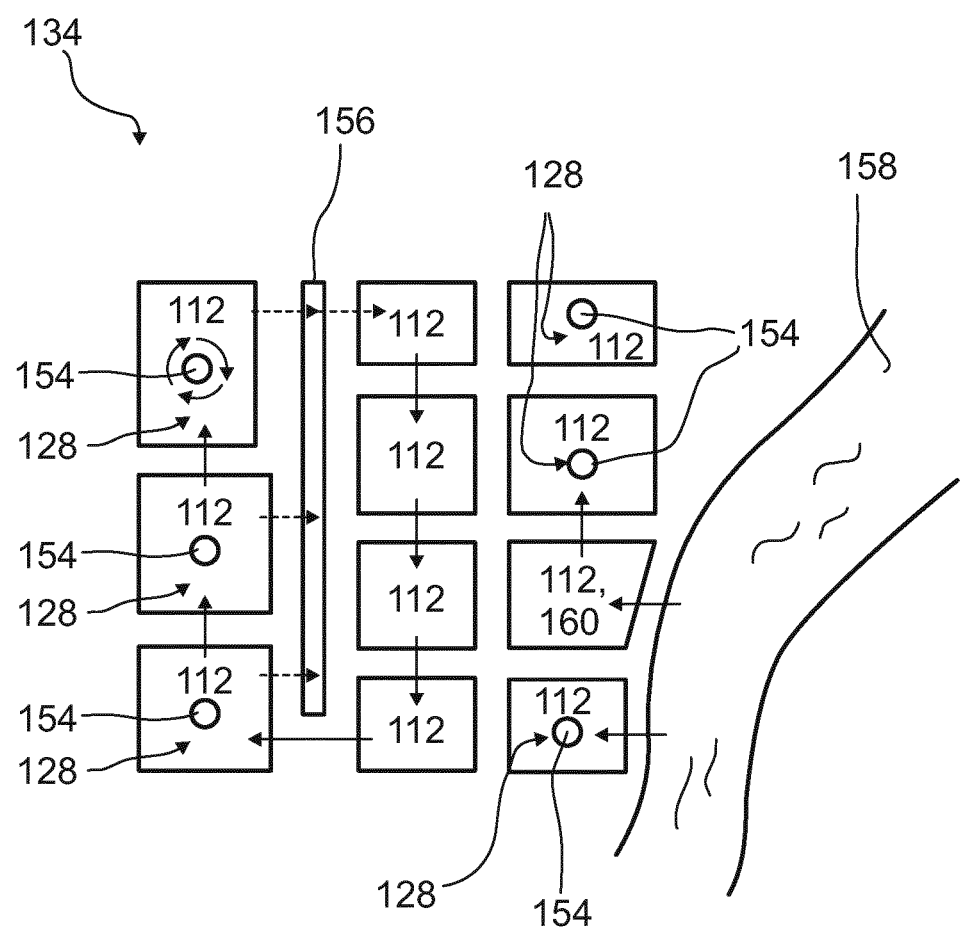
FIG. 4 illustrates a schematic view of a plurality of aquaculture ponds with particular focus on water management aspects.

FIG. 4 illustrates a schematic view of a plurality 134 of aquaculture ponds 112, some of which show a pattern 128 that comprises a circular structure 154 indicating the use of a circular pit as part of a drainage device. As indicated by curved arrows, the water of the aquaculture pond 112 may be circulating around the circular pit due to one or several pumps that may specifically be located in or connected to the circular pit and that may form part of the drainage device. Other aquaculture ponds 112 of the plurality 134 of aquaculture ponds 112 may lack the circular structure 154. The aquaculture ponds 112 showing the circular pattern 154 may in particular be used for growing crustaceans, specifically shrimp and/or prawn. The aquaculture ponds 112 lacking the circular structure 154 may specifically be used for water purification purposes, e.g. by means of microbes or by growing fish, for example tilapia, that may be fed on sediments, organic waste and other material that may be removed from other aquaculture ponds 112, such as those used for growing the crustaceans, specifically shrimp and/or prawn. Thus, as further illustrated in FIG. 4 by a series of dashed arrows, the sediments and the other material removed from one of the aquaculture ponds 112 may be fed into another aquaculture pond 112, for example by using at least one channel 156 or at least one pump. Further, as illustrated by a series of solid arrows, water may be fed from one aquaculture pond 112 into another aquaculture pond 112. As further also illustrated in FIG. 4, water may also be fed into the aquaculture pond 112 from a natural water body, such as a river 158. In particular, such an aquaculture pond may be used as a water reservoir 160

Figure 3:
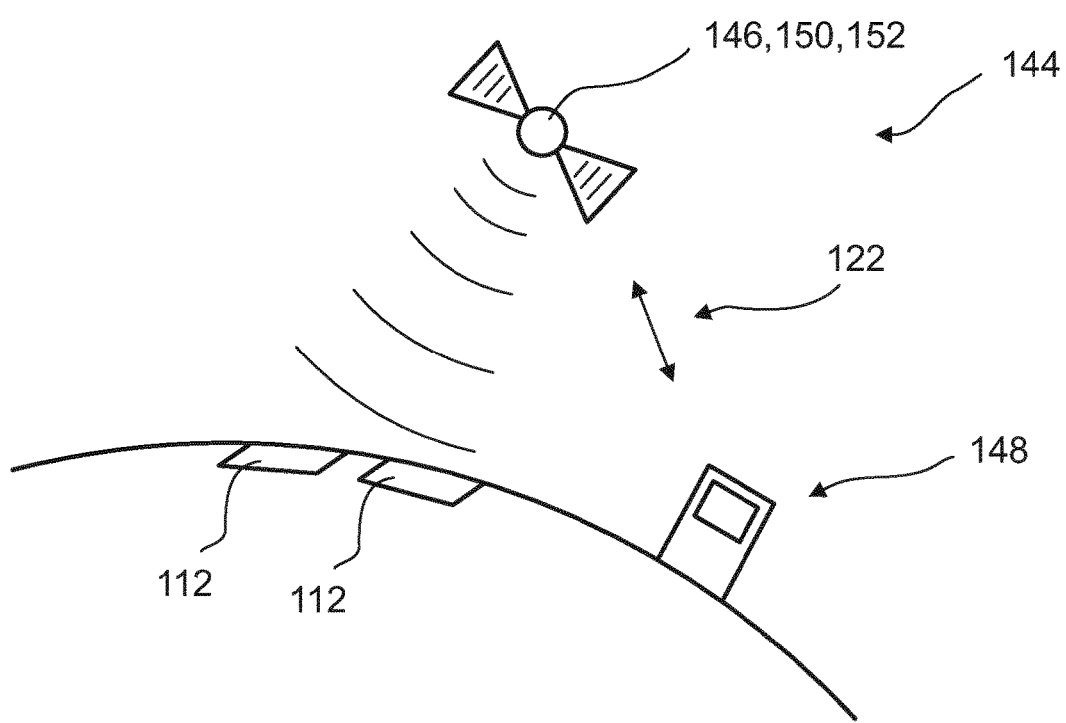
FIG. 3 illustrates an aquaculture pond monitoring system.

In a further aspect of the present invention an aquaculture pond monitoring system 144 for monitoring at least one aquaculture pond 112 is proposed. As illustrated in FIG. 3, the aquaculture pond monitoring system 144 comprises at least one monitoring device 146 configured for monitoring at least one aerial parameter of use of the aquaculture pond 112. The aquaculture pond monitoring system 144 further comprises at least one processor 148 programmed for determining a temporal development of the aerial parameter of use. The processor 148 is further programmed for determining an intensity of use of the aquaculture pond 112 by using the temporal development of the aerial parameter of use. In particular, the monitoring device 146 may comprise a satellite 150, as shown in FIG. 3. Further, as also shown in FIG. 3, the monitoring device may comprise an air-based sensor 152. In particular, the processor 148 may receive the aerial sensor data 122 from the monitoring device 146, in particular from the air-based sensor 152.

LIST OF REFERENCE NUMBERS 110 method for monitoring at least one aquaculture pond
112 aquaculture pond
114 flow chart
116 monitoring at least one aerial parameter of use of the at least one aquaculture pond
118 determining a temporal development of the aerial parameter of use
120 determining an intensity of use of the aquaculture pond by using the temporal development of the aerial parameter of use
122 aerial sensor data
124 map
125 demarcated area
126 color of the aquaculture pond
127 aquaculture pond
128 pattern within the aquaculture pond
130 turbulence of the aquaculture pond
131 aquaculture pond
132 aeration of the aquaculture pond
134 plurality of aquaculture ponds
136 comparing the intensity of use with at least one reference intensity
138 determining at least one urgency score based on the result of the comparison in step d)
140 signaling a need for a disease treatment depending on the urgency score
142 at least one disease treatment step of the aquaculture pond
144 aquaculture pond monitoring system
146 monitoring device
148 processor
150 satellite
152 air-based sensor
154 circular structure
156 channel
158 river
160 reservoir

CITED REFERENCES

Ottinger et al. (Marco Ottinger, Kersten Clauss and Claudia Kuenzer, "Large-Scale Assessment of Costal Aquaculture Ponds with Sentinel-1 Time Series Data", Remote Sensing 2017, 9(5), 440)
Eruvaka Technologies Pvt. Ltd., Andhra Pradesh, India (www.eruvaka.com)
WO 2015/132661 A2
WO 2002/027995 A2

The invention claimed is:

1. A method for monitoring at least one aquaculture pond, comprising:
  a) monitoring at least one aerial parameter of use of the at least one aquaculture pond, wherein the aerial parameter of use comprises at least one parameter derived by remote aerial sensing using an air-based sensor, wherein the aerial parameter of use comprises at least two values, wherein the at least two values indicate: i) the aquaculture pond is active, ii) the aquaculture pond is drained; or iii) the aquaculture pond is filled with water and is essentially free of aquatic organisms intended for aquaculture, and wherein the at least one remote parameter of use is derived from at least one of the following: a turbulence generated within the aquaculture pond; air bubbles generated within the aquaculture pond; a color of the aquaculture pond; a reflectance of the aquaculture pond; and a pattern within the aquaculture pond;
  b) determining a temporal development of the aerial parameter of use;

c) determining an intensity of use of the aquaculture pond by using the temporal development of the aerial parameter of use, wherein the intensity of use comprises information on a duration of the aquaculture pond being active, the duration for which the aerial parameter of use has the value i), wherein in step c) the intensity of use of the aquaculture pond is determined by sensing the interval between a filled and a drained state of the aquaculture pond; and d) comparing the intensity of use of the aquaculture pond, as determined by sensing the interval between a filled and a drained state of the aquaculture pond, with at least one reference intensity of use, wherein the reference intensity of use comprises at least one threshold duration indicating or defining the minimum duration of breeding during which the aquaculture pond must have been active.

2. The method according to claim 1, wherein step a) comprises acquiring aerial sensor data, from at least one map or image of aerial sensor data, or a sequence of aerial sensor data, wherein step a) further comprises assigning the at least one aerial parameter of use to the aquaculture pond by using the aerial sensor data.

3. The method according to claim 1, wherein the remote aerial sensing comprises sensing by one or more of satellite sensing, sensing by an airplane, or sensing by a drone.

4. The method according to claim 1, wherein the method further comprises identifying the at least one aquaculture pond in at least one aerial image, optionally at least one aerial image from which the at least one aerial parameter of use in step a) is derived.

5. The method according to claim 1, wherein the value i) is assigned to the aquaculture pond upon identification of at least one of the following: an aeration of the aquaculture pond; an active feeding instrumentation; an automated feeding instrumentation; a security means; and a change in the security means.

6. The method according to claim 1, wherein in step a) the at least one aerial parameter of use is determined for the at least one aquaculture pond at a predetermined frequency.

7. The method according to claim 1, wherein, depending on the comparison with the at least one reference intensity of use, information on at least one breeding result is generated.

8. The method according to claim 1, further comprising:
e) determining at least one urgency score based on the result of the comparison in step d).

9. The method according to claim 8, further comprising: signaling a need for a disease treatment depending on the urgency score, specifically if the urgency score is greater than or greater than or equal to a predefined threshold value.

10. The method according to claim 9, further comprising:
g) at least one disease treatment step of the aquaculture pond.

11. The method according to claim 1, the method further comprising:
h) determining at least one productivity score based on the result of the comparison in step d).

12. An aquaculture pond monitoring system for monitoring at least one aquaculture pond, comprising:

at least one monitoring device configured for monitoring at least one aerial parameter of use of the aquaculture pond, wherein the aerial parameter of use comprises at least one parameter derived by remote aerial sensing using an air-based sensor, wherein the aerial parameter of use comprises at least two values, wherein the at least two values indicate: i) the aquaculture pond is active, ii) the aquaculture pond is drained; or iii) the aquaculture pond is filled with water and is essentially free of aquatic organisms intended for aquaculture, and wherein the at least one remote parameter of use is derived from at least one of the following: a turbulence generated within the aquaculture pond; air bubbles generated within the aquaculture pond; a color of the aquaculture pond; a reflectance of the aquaculture pond; and a pattern within the aquaculture pond; and at least one processor programmed
for determining a temporal development of the aerial parameter of use;
for determining an intensity of use of the aquaculture pond by using the temporal development of the aerial parameter of use, wherein the intensity of use comprises information on a duration of the aquaculture pond being active, the duration for which the aerial parameter of use has the value i), wherein the intensity of use of the aquaculture pond is determined by sensing the interval between a filled and a drained state of the aquaculture pond; and
for comparing the intensity of use of the aquaculture pond, as determined by sensing the interval between a filled and a drained state of the aquaculture pond, with at least one reference intensity of use, wherein the reference intensity of use comprises at least one threshold duration indicating or defining the minimum duration of breeding during which the aquaculture pond must have been active.

13. The aquaculture pond monitoring system according to claim 12, wherein the processor is further programmed for generating information on at least one breeding result using the comparison with the at least one reference intensity of use.

14. The aquaculture pond monitoring system according to claim 13, wherein the processor is further programmed to determine at least one urgency score based on the result of the comparison of the intensity of use with the reference intensity of use.

15. The aquaculture pond monitoring system according to claim 14, wherein the processor is further programmed for signaling a need for a disease treatment depending on the urgency score.

16. The aquaculture pond monitoring system according to claim 14, wherein the aquaculture pond monitoring system further comprises a transmitter for transmitting a signal to a predefined location remote from the processor.

17. The aquaculture pond monitoring system according to claim 16, wherein the aquaculture pond monitoring system further comprises a medication dispenser, wherein the medication dispenser is configured for releasing medication after receiving from the transmitter the signal indicating the need for the disease treatment.

* * * * *